(12) United States Patent
Hsieh et al.

(10) Patent No.: US 6,829,910 B1
(45) Date of Patent: Dec. 14, 2004

(54) REMOVAL OF ENCLOSED GLASS PARTS AFTER CUTTING USING HEATING AND COOLING TECHNIQUES

(75) Inventors: John Hsieh, San Jose, CA (US); Robert M. Tierney, Fremont, CA (US)

(73) Assignee: Asahi Glass Company, Ltd., Tokyo (JP)

( * ) Notice: Subject to any disclaimer, the term of this patent is extended or adjusted under 35 U.S.C. 154(b) by 0 days.

(21) Appl. No.: 09/558,083

(22) Filed: Apr. 25, 2000

(51) Int. Cl.[7] .................. C03B 33/033; C03B 33/04
(52) U.S. Cl. .................. 65/112; 83/15; 83/16
(58) Field of Search ................ 65/112, 166, 174; 83/14, 15, 16, 170, 171; 156/583.1, 285; 249/78

(56) References Cited

U.S. PATENT DOCUMENTS

| | | | |
|---|---|---|---|
| 2,329,922 A | * | 9/1943 | McCormick, Jr. |
| 3,474,944 A | * | 10/1969 | Chatelain et al. |
| 4,467,168 A | * | 8/1984 | Morgan et al. |
| 4,934,112 A | * | 6/1990 | Jackson |
| 6,187,408 B1 | * | 2/2001 | Bian et al. |

FOREIGN PATENT DOCUMENTS

| | | |
|---|---|---|
| JP | 2-92837 | 4/1990 |
| JP | 7-223828 | 8/1995 |

OTHER PUBLICATIONS

Webster's Third New International Dictionary, p. 901, definition of "fracture".*

* cited by examiner

*Primary Examiner*—Sean Vincent
(74) *Attorney, Agent, or Firm*—Oblon, Spivak, McClelland, Maier & Neustadt, P.C.

(57) ABSTRACT

A method for forming a magnetic disk comprises the following steps. First, an inner and outer cut is provided in a work piece. The waste piece thus comprises an outer waste piece, an inner waste piece, and a region between the inner and outer waste pieces that is to be used as a substrate for manufacturing a magnetic disk. The outer waste piece is separated from the substrate by applying a hot plate against the outer waste piece, thereby causing it to thermally expand and separate from the substrate. The substrate is then placed over (but not in contact with) a hot plate, while a cooling element is placed on the inner waste piece. This causes the substrate to thermally expand while the inner waste piece thermally contracts. Thus, a gap forms between the substrate and inner waste piece, thereby permitting the separation of the inner waste piece from the substrate.

42 Claims, 3 Drawing Sheets

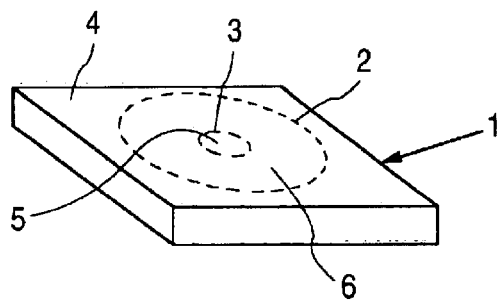
FIG. 1
(PRIOR ART)
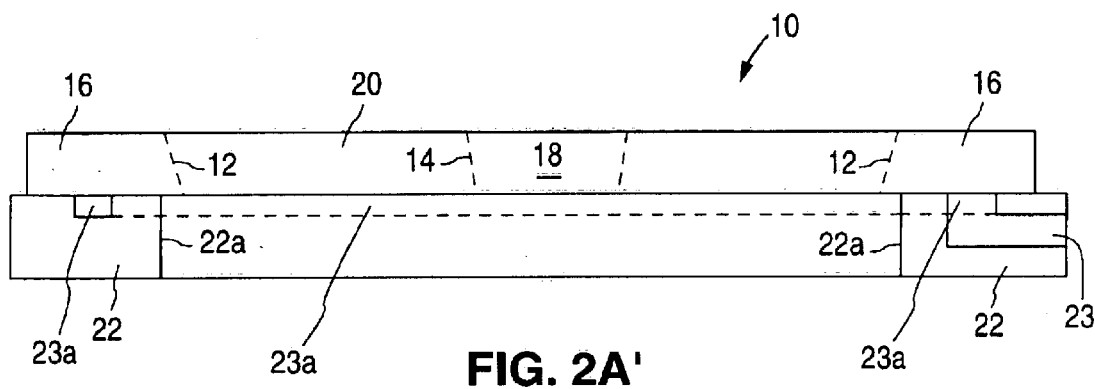
FIG. 2A'
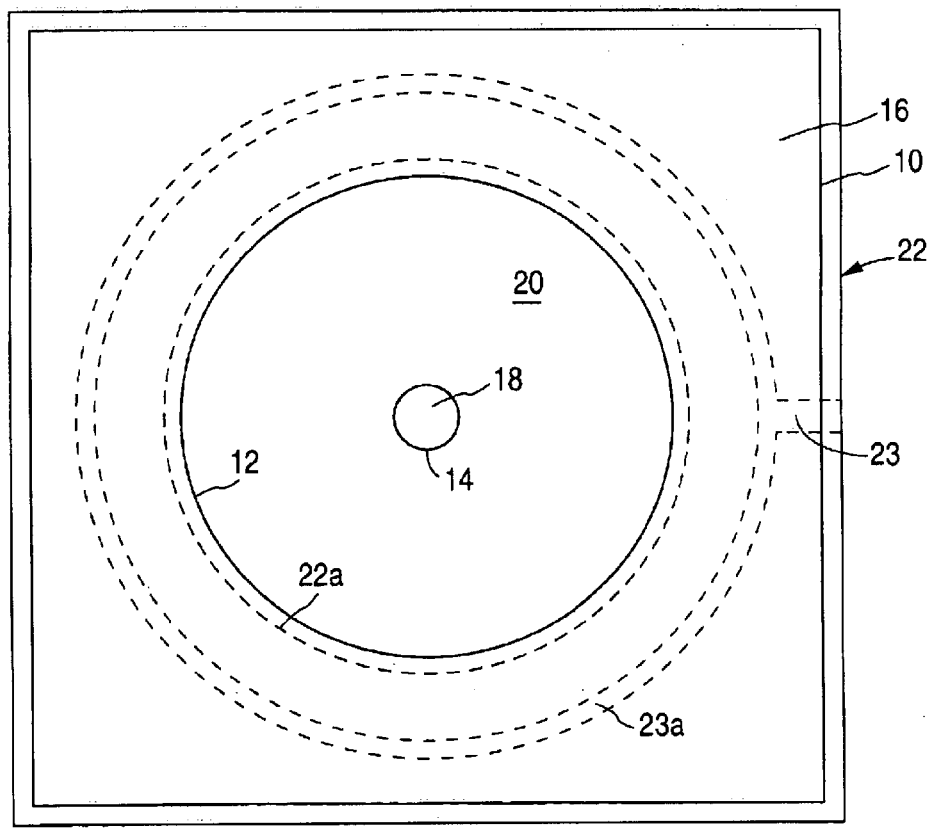
FIG. 2A"

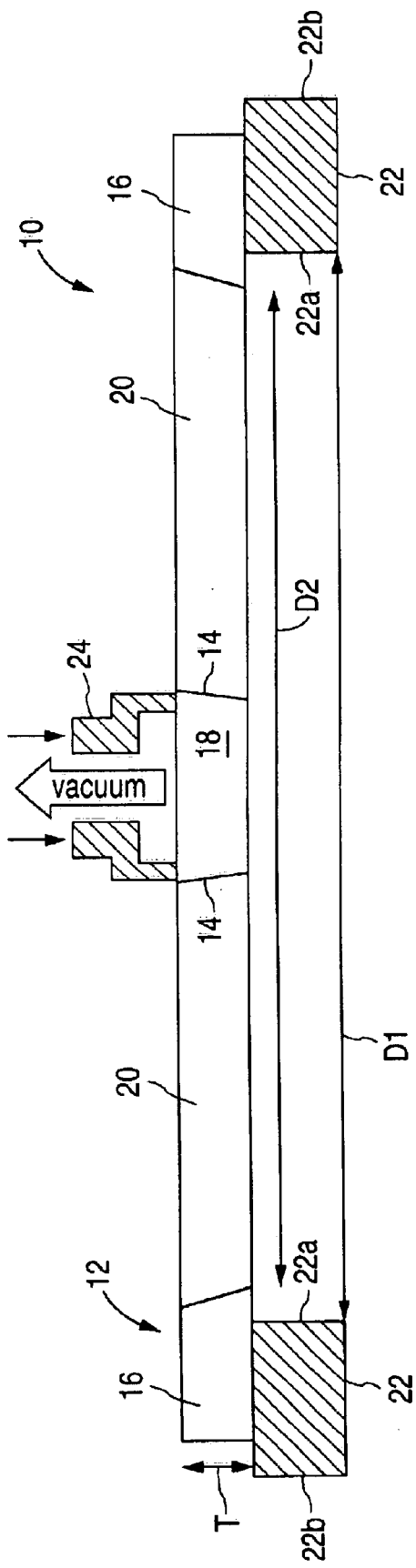
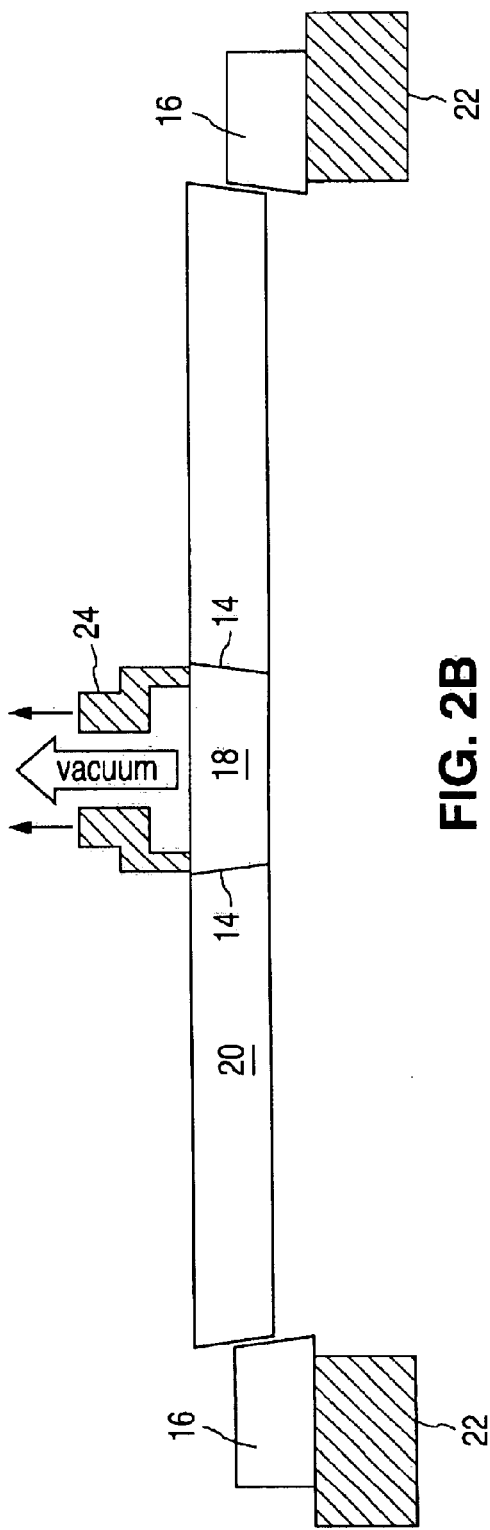
FIG. 2A
FIG. 2B

REMOVAL OF ENCLOSED GLASS PARTS AFTER CUTTING USING HEATING AND COOLING TECHNIQUES

BACKGROUND OF THE INVENTION

This invention pertains to a method for separating a product piece from one or more waste pieces. This invention also pertains to a method for cutting and separating pieces of glass. This invention also pertains to a method for making a glass substrate for use in magnetic disk manufacturing.

Japanese laid open patent publication 2-92837 discusses a method for cutting and separating a planar glass work piece into a product piece and a waste piece. During the 2-92837 method, the following steps are performed:
1. A circular scribe line is mechanically formed in a circular glass work piece to define a circular waste piece within the glass work piece.
2. The glass work piece is heated from the side containing the scribe line to propagate a crack from the scribe line into the interior of the work piece.
3. The glass work piece is heated a second time from the opposite side. This causes the crack to further propagate into the work piece.
4. A brass chilling tool is cooled by bringing the chilling tool into contact with dry ice. The chilling tool is then applied against the waste piece to cause the waste piece to thermally contract. This chilling tool also pushes against the waste piece to separate the waste piece from the rest of the work piece.

Japanese laid open publication 7-223828 criticizes the use of the 2-92837 chilling tool, and instead proposes the following method:
1. A scribe line is formed in a glass work piece with a mechanical scribing tool. This results in a crack that propagates partially through the work piece at an angle. The scribe line defines an inner portion of the work piece.
2. A portion of the work piece is heated (from the same side as the scribe line) to propagate the crack entirely through the thickness of the work piece. The crack propagates at an angle relative to the major surface of the work piece.
3. The inner portion of the work piece is pushed downward by a push rod, and separated from the remainder of the work piece.

In summary, the 2-92837 and 7-223828 references discuss mechanically scribing a glass work piece to form a crack in the work piece, and thermally propagating the crack through the work piece.

Another technique for scribing a glass work piece comprises using a laser to cut the work piece into a product piece and waste pieces. FIG. 1 illustrates a glass work piece 1 comprising cuts 2, 3 which extend through the thickness of work piece 1. Cuts 2, 3 separate work piece 1 into an outer waste piece 4, an inner waste piece 5, and a product piece 6 which is subsequently used as a substrate for the manufacture of a magnetic disk. Even though cuts 2, 3 extend through the entire thickness of work piece 1, one must still separate product piece 6 from waste pieces 4 and 5. This is difficult, because waste pieces 4, 5 contact and hold product piece in a manner that does not generally permit one to simply slide the product piece relative to the waste pieces. It is an object of this invention to provide a method for separating a work piece from one or more waste piece.

One problem with prior art break-out techniques is that they generate glass splinters and/or defects in the glass work piece. This reduces production yields. It is an object of some embodiments of the invention to minimize or reduce the number of splinters and/or defects generated when one separates a work piece from one or more waste pieces.

SUMMARY

A method in accordance with a first embodiment of the invention comprises the step of providing a work piece including one or more cuts extending through the work piece. The cuts define a product piece and one or more waste pieces within the work piece. The product piece is separated from one of the waste pieces by providing a temperature difference between the product piece and the waste piece so that one expands relative to the other (and/or contracts relative to the other). This expansion (and/or contraction) facilitates separating the work piece from said one of the waste pieces.

In one embodiment, the work piece is a brittle material such as glass or glass ceramic. The cuts can be formed by applying radiant energy (e.g. a laser) to the work piece. Typically, a cooling fluid (e.g. a liquid or a gas) is applied to the work piece after application of the laser to form the cut, and ensure that it extends through the thickness of the work piece.

In one embodiment, the temperature difference between the product piece and the waste piece is greater than 125° C., and preferably greater than 150° C. However, the temperatures applied to the work piece should not be so extreme as to potentially damage or warp the work piece. Typically the temperature difference is between about 150 and 300° C.

In one embodiment, the waste piece partially or completely surrounds the product piece. In such an embodiment, a temperature difference is provided such that the waste piece is hotter than the product piece, so that the waste piece is in an expanded state compared to the product piece.

In one embodiment, the temperature difference is provided by placing the waste piece against the surface of a heating element to thereby heat the waste piece. One or more channels are formed in the heating element that extend to the surface of the heating element against which the waste piece is placed. A vacuum is applied to the one or more channels to generate a force that holds the waste piece flush against the heating element to thereby prevent the waste piece from warping.

In another embodiment, the product piece partially or completely surrounds the waste piece. In such an embodiment, the temperature difference is provided such that the product piece is hotter than the waste piece, so that the product piece is in an expanded state compared to the waste piece.

A method in accordance with another embodiment of the invention comprises separating a product piece (e.g. a substrate used for the manufacture of a magnetic disk) from inner and outer waste pieces. In one such embodiment, the substrate is separated from the outer waste piece by heating the outer waste piece so that the outer waste piece expands relative to the substrate. The substrate (along with the inner waste piece) is then lifted (or lowered) relative to the outer waste piece to thereby separate the substrate from the outer waste piece. (Alternatively, the outer waste piece can be lifted or lowered relative to the substrate.)

Thereafter, the substrate is heated relative to the inner waste piece, and the inner waste piece is cooled relative to the substrate, so that the substrate expands relative to the inner waste piece, and the inner waste piece contracts relative to the substrate. Thus, a gap develops between the substrate and inner waste piece that facilitates separation of the substrate from the inner waste piece.

In another embodiment, the substrate is heated by placing the substrate in proximity to, but not in contact with, a heating element. Advantageously, this prevents the major surfaces of the substrate from being scratched during this process.

In one embodiment, the heating and cooling of the substrate and waste pieces is accomplished without physically contacting the data recording surfaces of the substrate.

After the substrate is separated from the inner and outer waste pieces, an underlayer (e.g. Cr, NiP, NiAl, a Cr alloy or other material), a magnetic alloy (e.g. a Co or Fe alloy) and a protective overcoat (e.g. carbon, hydrogenated carbon, or a ceramic material such as $ZrO_2$) are deposited, in that order, onto the substrate to thereby form a magnetic disk. This can be accomplished by sputtering, evaporation, ion plating, or other vacuum deposition processes.

BRIEF DESCRIPTION OF THE DRAWINGS

FIG. 1 illustrates a work piece comprising cuts in accordance with the prior art.

FIGS. 2A and 2B illustrate in cross section a work piece being separated from an outer waste piece in accordance with the present invention.

FIGS. 2A' and 2A" illustrate in cross section and plan view, respectively, a work piece being separated from an outer waste piece using a hot plate that is modified in accordance with an alternate embodiment of the invention.

Figure 3A:
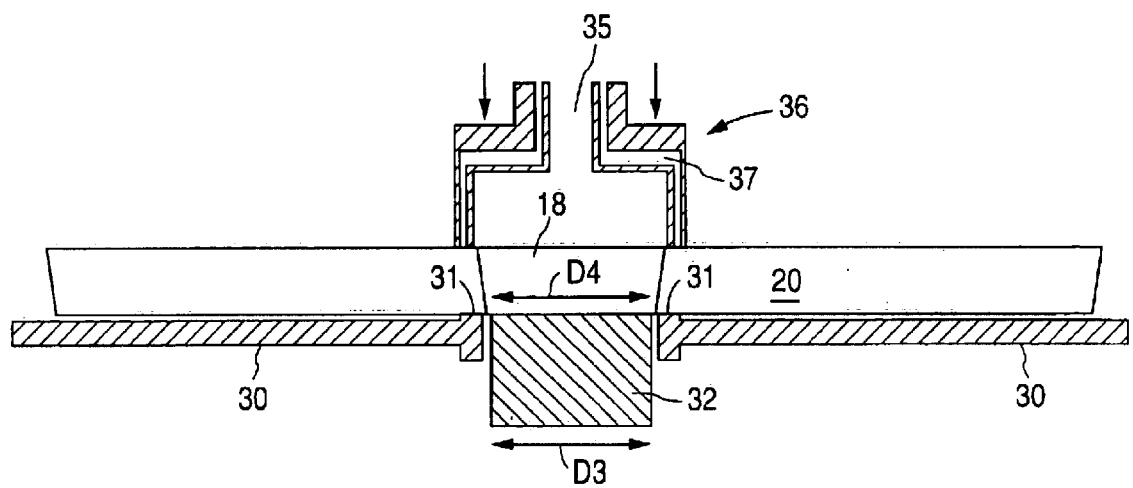
FIGS. 3A and 3B illustrate in cross section a work piece being separated from an inner waste piece in accordance with the invention.

These drawings are not drawn to scale.

DETAILED DESCRIPTION

A method in accordance with the present invention comprises cutting a work piece 10 to thereby form cuts 12, 14 (FIG. 2). In one embodiment, work piece 10 is a glass square, e.g. 110 mm by 110 mm, and 1 mm thick. However, these dimensions are merely exemplary, as is the shape of work piece 10. Glass square 10 can be formed by cutting or breaking square 10 out of a much larger glass sheet. This glass sheet can be formed by drawing, pressing, floating or other methods.

Cuts 12, 14 can be provided using any of a number of techniques. For example, cuts 12, 14 can be formed using radiant energy, e.g. a laser. In one such embodiment, a scribe line can be provided by applying a laser beam from a $CO_2$ laser against work piece 10 followed by a cooling jet of air and/or water immediately behind the laser. This typically forms a crack through some, but not all, of the thickness of the glass. Next, the crack can be propagated from the scribe line all the way through the thickness of work piece 10 by applying a second laser beam along the scribe line. (In lieu of or in addition to air or water, other gases or liquids, e.g. alcohol or hydrocarbons such as methanol or ethanol can be used. These materials evaporate rapidly.)

The laser can be applied to work piece 10 using a technique similar to the one described in U.S. patent application Ser. No. 09/407,003, filed Sep. 28, 1999 by Hsieh et al., incorporated herein by reference.

Alternatively, cuts 12, 14 can be formed by initially mechanically scribing work piece 10, and then passing a laser over the scribe line. Alternatively, cuts 12, 14 can be formed by forming a scribe line in work piece 10, and then thermally stressing the work piece material at the location of the scribe lines. Cut 12 is typically 65, 84 or 95 mm in diameter. Cut 14 typically has a diameter of 20 or 25 mm. (These are standard outer and inner diameters for magnetic disks. However, cuts 12 and 14 can have other diameters as well.)

Separation of the Substrate from the Waste Pieces

After forming cuts 12, 14, it is necessary to separate outer waste piece 16 from the remainder of work piece 10. It is also necessary to separate inner waste piece 18 from work piece 10. In one embodiment, this is accomplished using the following technique.

First, outer waste piece 16 is heated relative to the portion 20 of work piece 10 that is ultimately used as a disk substrate. Typically, the difference between the temperature of outer waste piece 16 and portion 20 is between 150 and 200° C. (If this temperature difference is too low, there will be insufficient clearance to permit removal of waste piece 16.) The temperature difference between waste piece 16 and portion 20 can be greater than 200° C., but one must take care to ensure that stresses thermally induced in the glass do not warp or otherwise damage the substrate. It is expected that as laser cutting technology improves, the quality of the cuts that can be formed with a laser will also improve, and the temperature differentials that can be used to separate substrates from waste pieces will decrease.

Figure 3B:
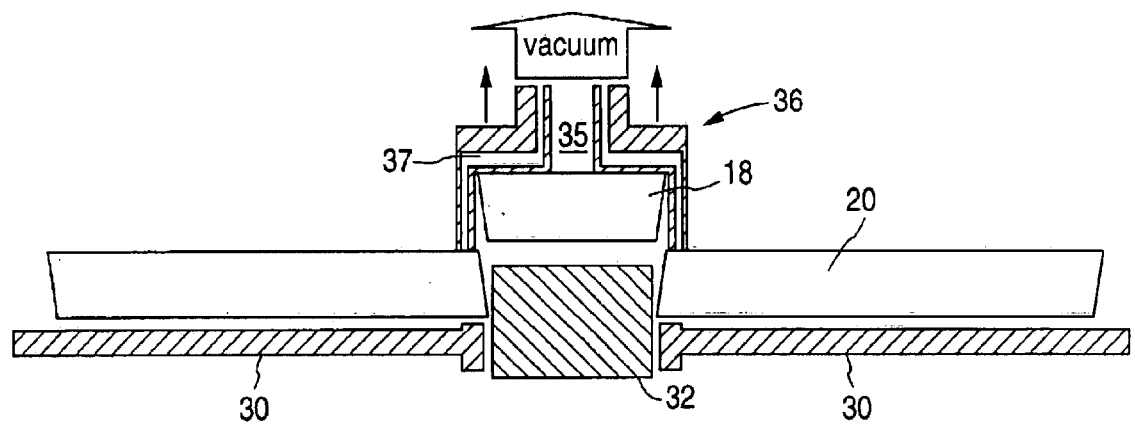

In one embodiment, waste piece 16 is heated by placing waste piece 16 against a heating element. This heating element can be a hot plate 22, e.g. made of aluminum or other thermally conductive material. Since waste piece 16 will ultimately be thrown out, it does not matter whether its surface is damaged due to contact with hot plate 22. By heating waste piece 16 to a temperature as described above, waste piece 16 will expand sufficiently, relative to substrate 20, such that substrate 20 (and waste piece 18) can be separated from waste piece 16 simply by lifting substrate 20. (As shown in FIG. 2B, substrate 20 and waste piece 18 can be separated from waste piece 16 by using a vacuum grip 24 to lift waste piece 18. Since waste piece 18 firmly contacts substrate 20, substrate 20 is also lifted out of waste piece 16 during this process. Advantageously, the data recording surfaces of substrate 20 are not mechanically contacted during this process. Alternatively, waste piece 18 (and substrate 20) can be gripped as shown in FIGS. 3A and 3B, described below.)

In one embodiment, substrate 20 can be lifted out of waste piece 16 after waste piece 16 has been in contact with hot plate 22 for a time period of about two to three seconds. However, time periods other than two to three seconds can be used. It is desirable that this time period is sufficiently long for heat to diffuse through the thickness of waste piece 16 prior to lifting substrate 20 out of waste piece 16.

In one embodiment, hot plate 22 has an inner opening 22a that has a diameter D1 of about 99 mm. In other words, diameter D1 of opening 22a is slightly larger than diameter D2 of substrate 20. This helps to ensure that substrate 20 is not heated during this process.

In one embodiment, the difference between diameter D1 and diameter D2 is greater than the work piece thickness T. This ensures that when heating waste piece 16, heat can diffuse all of the way through the thickness of waste piece 16 before that heat has a chance to diffuse into substrate 20. Thus, the entire thickness of waste piece 16 can be heated without having heat diffuse into substrate 20 to expand substrate 20.

The difference between diameter D1 and diameter D2 also provides sufficient clearance such that the process described herein can be easily automated and performed by machinery. In other words, work piece 10 can be placed onto hot plate 22 by robotic equipment without putting substrate 20 in contact with hot plate 22.

Hot plate 22 typically has a square-shaped outer perimeter 22b that surrounds the outer, square-shaped perimeter of waste piece 16. This has the following advantage. If hot plate 22 did not laterally surround the outer perimeter of waste piece 16, the outermost portion of waste piece 16 would not be adequately heated. Thus, the inner portion of waste piece 16 would expand relative to the outer portion of waste piece 16, and this might cause waste piece 16 to crack and generate chips.

When separating waste piece 16 from substrate 20, it is not necessary to cool substrate 20 while heating waste piece 16 if waste piece 16 is heated to a sufficient temperature (e.g. about 200° C.). However, in an alternate embodiment, waste piece 16 can be heated to a temperature less than the desired temperature differential (instead of 200° C.), and substrate 20 can be cooled (e.g. with a cold gas or liquid) to provide an appropriate temperature differential between waste piece 16 and substrate 20.

As seen in FIG. 2, cut 12 between waste piece 16 and substrate 20 is at an angle that facilitates the lifting of substrate 20 out of waste piece 16. However, in other embodiments, cut 12 is not at an angle.

After waste piece 16 is separated from substrate 20, it is necessary to separate waste piece 18 from substrate 20. In one embodiment, this is accomplished by heating substrate 20 relative to waste piece 18, cooling waste piece 18 relative to substrate 20, or both cooling waste piece 18 and heating substrate 20. (This heating and cooling can be accomplished either simultaneously or other than simultaneously).

In the embodiment described below, substrate 20 is heated to a temperature less than 200° C., e.g. 125° C. (Waste piece 18 is cooled during this embodiment so that the total temperature differential between waste piece 18 and substrate 20 is about 200° C.) It is advantageous to avoid subjecting substrate 20 to large temperature cycles. In particular, it is easier to implement a manufacturing process that does not require ramping temperatures up and down by 200° C. Also, it takes less time to heat substrate 20 to a temperature that is less than 200° C. than it takes to heat substrate 20 to 200° C.

Another advantage to minimizing the temperature swing of substrate 20 is that when one heats glass, the entire surface of the glass is placed in compression. If the glass is cooled too rapidly, the glass is in tension, which is harmful, especially if there is any preexisting damage, because rapid cooling can propagate cracks.

Referring to FIG. 3A, in one embodiment substrate is separated from waste piece 18 by holding substrate 20 over a second hot plate 30 (FIG. 3A). Advantageously, the data recording surfaces of substrate 20 are in proximity to, but do not contact, hot plate 30. (Support 31 extending from the top surface of hot plate 30 contacts a small portion of substrate 20 at its inner diameter. This is not a problem, since this is the portion of substrate 20 that will eventually be mounted on a spindle within a disk drive.) Second hot plate 30 heats substrate 20 to a temperature of about 125° C. Simultaneously, waste piece 18 is cooled by applying a cooling element 32 against waste piece 18. Cooling element 32 can be a thermoelectric cooling element 32, e.g. as described by Robert Smythe in "Cooling: Thermoelectric Cooling for Photonics Applications", published in The Photonics Design and Applications Handbook in 1997, incorporated herein by reference. Alternatively, instead thermoelectrically cooling, cooling element 32 can contain conduits or reservoirs in which a coolant circulates. Cooling element 32 can be cooled in other ways as well, e.g. by placing element 32 against cold material, e.g. liquid nitrogen. In one embodiment, inner waste piece 18 is cooled to about −75° C., e.g. by placing cooling element 32 against waste piece 18 for about two to three seconds. The application of heat to substrate 20 and cooling of waste piece 18 causes substrate 20 to expand relative to waste piece 18, and waste piece 18 to contract relative to substrate 20. Thus, a clearance develops between substrate 20 and waste piece 18 so that waste piece 18 can be pushed upward and out of the opening in substrate 20, e.g. by raising cooling element 32 (FIG. 3B).

As shown in FIG. 3B, waste piece 18 is removed by raising cooling element 32 upon which waste piece 18 rests. Waste piece 18 is pushed against a vacuum channel 35 that is part of a gripping structure 36. After waste piece 18 is pushed against vacuum channel 35, gripping structure 36 is raised, thereby lifting both waste piece 18 and substrate 20. (An outer vacuum channel 37 facilitates lifting of substrate 20.) Gripping structure 36 does not contact the data recording surfaces of substrate 20, so the data recording surfaces are not damaged or scratched during lifting.

As mentioned above, the temperature differential between the temperature of substrate 20 and inner waste piece 18 is about 200° C. However, as mentioned above, as the quality of laser cuts improves with technology, it is expected that separating substrate 20 from waste piece 18 can be accomplished with a lower temperature differential.

In one embodiment, the diameter D3 of cooling element 32 is smaller than the diameter D4 of waste piece 18. This is because one would not want to cool the inner diameter of substrate 20 (e.g. to ensure that the inner diameter of substrate 20 does not thermally contract, and to avoid tensile stress in the material of substrate 20). In one embodiment, the difference between diameters D3 and D4 is greater than or equal to the thickness of waste piece 18. This ensures that the entire thickness of waste piece 18 can be cooled before heat starts to diffuse out of substrate 20 and cause a temperature drop in substrate 20.

It is noted that the data recording surfaces of substrate 20 are never in contact with structures that could scratch these surfaces. Accordingly, the method of the present invention represents an improvement over other processes in which cooling or heating elements are placed against the surfaces of substrates.

Processing After Separation of the Substrate from the Waste Pieces

After substrate 20 is separated from waste pieces 16, 18, substrate 20 can be subjected to additional processing, e.g. an edge polishing process as described by Bajorek in U.S. patent application Ser. No. 09/369,030, filed Aug. 4, 1999, incorporated herein by reference. This edge polishing process rounds the corners of the inner and outer edges of substrate 20. In lieu of or in addition to such edge polishing, chamfers can be placed at the inner and outer diameters of substrate 20. Substrate 20 can then be subjected to various lapping and/or polishing steps as required.

In some embodiments, substrate 20 is subjected to chemical strengthening. During chemical strengthening, substrate 20 is immersed in a molten potassium salt bath. This results in the formation of a compression layer at or near the surface of substrate 20 for strengthening substrate 20.

Figure 4:
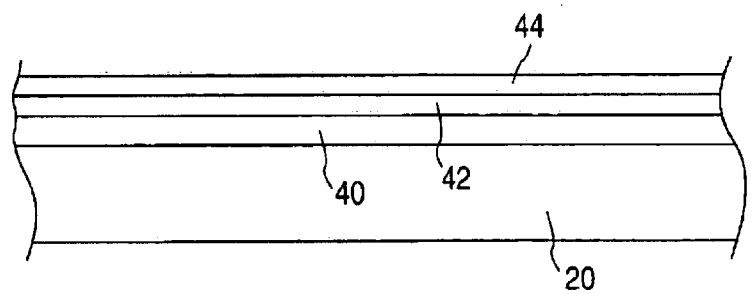
FIG. 4 illustrates in cross section the work piece of FIGS. 2 and 3 after the work piece has been separated from inner and outer waste pieces (thereby leaving a substrate as the product piece), and after an underlayer, magnetic layer and protective overcoat are deposited on the substrate.

Thereafter, an underlayer 40 (e.g. Cr, a Cr alloy, NiP, NiAl, or other appropriate material), a magnetic alloy 42 (e.g. a Co or Fe alloy) and a protective overcoat 44 (e.g. carbon or hydrogenated carbon) are deposited on substrate 20, in that order, to form a magnetic disk 46 (FIG. 4). This can be accomplished using a vacuum deposition technique such as sputtering, evaporation, ion plating, or other method. An example of a method for completing the manufacture of a magnetic disk is described in U.S. patent application Ser. No. 08/894,753, filed by Bertero et al. on Dec. 4, 1997, incorporated herein by reference.

Alternative Embodiment of the Method for Separating Substrate 20 from Waste Piece 16

It has been found that float or drawn glass sheets that have not been properly annealed often contain internal stresses. These stresses can cause glass to warp when the glass is heated to a sub-annealing temperature. In fact, it has been observed that heating of glass sheets that have not been properly annealed can cause a glass sheet to warp by as much as 2 mm from the highest to lowest point over a 100×100 mm area at a temperature as low as 200° C. (The glass sheet can warp for other reasons, such as non-uniform heating, non-uniform composition or other factors.) If warping occurs when work piece 10 is placed against hot plate 22, waste piece 16 will not be heated uniformly. As a result, waste piece 16 could shatter or warp into a shape that interferes with the separation of waste piece 16 from substrate 20. (This problem is more severe if work piece 10 is made thicker.) Accordingly, in one embodiment of the invention, hot plate 22 comprises channel 23 (FIG. 2A') for holding waste piece 16 flush against hot plate 22 and for preventing waste piece 16 from warping. In one embodiment, a portion 23a of channel 23 extends in the shape of a circle laterally surrounding cut 12. Portion 23a is typically milled into the surface of hot plate 22. In another embodiment, channel 23 terminates in a set of separate regions (e.g. discrete vacuum openings) at the surface of hot plate 22. In general, any size, shape or configuration of channels can be used provided that the channel(s) hold the substrate to a sufficient degree to prevent excess warping. In any embodiment, a vacuum can be applied using conventional means (e.g. a mechanical pump) to inlet 23b of channel 23. The vacuum is preferably applied immediately after the glass touches hot plate 22. (A delay in the application of the vacuum could enable the glass to warp and subsequently prevent the vacuum from acting on work piece 10.)

Because areas of waste piece 16 directly above portion 23a of channel 23 do not directly contact the heat source, it is conceivable that non-uniform stresses around these areas can lead to cracking. To prevent this, width W of portion 23a is minimized. In general, width W should not be greater than thickness T of work piece 10. If more force is needed to hold waste piece 16 flat against hot plate 20, the strength of the vacuum should be increased or separate narrow vacuum channels should be provided in other regions of hot plate 22. Lastly, the total vacuum force exerted on the glass (i.e. the product of the vacuum pressure times the area) and the pattern of the vacuum channels should not hinder the glass from expanding relatively freely during heating.

While the invention has been described with respect to specific embodiments, those skilled in the art will recognize that changes can be made in form and detail without departing from the spirit and scope of the invention. For example, the glass work piece can be any form of glass, e.g. aluminosilicate glass, borosilicate glass, or other silica based glass comprising any of a number of additives. The glass can be formed using different techniques, and can be cut using different techniques. The product piece can have a shape other than that of a disk.

While one embodiment of the invention uses a work piece that is 1 mm thick, other thicknesses can be used as well. In one embodiment, a thicker work piece e.g. 1.3 mm thick, can be used. When using a thicker work piece, it is advantageous to apply heat both sides of the work piece (or cool both sides of the work piece).

While one embodiment uses a temperature differential of 200° C., it is stressed that other temperature differentials can be used. In some embodiments, the temperature difference is preferably approximately 100° C. or greater, more preferably approximately 125° C. or greater, and most preferably approximately 150° C. or greater. Moreover, while heating or cooling alone can be used, in some embodiments it is desirable to limit the temperature cycle to which a given piece of glass is subjected for the reasons discussed earlier. In such embodiments, a piece is preferably subjected to a temperature cycle of approximately 200° C. or less, more preferably approximately 150° C. or less, and most preferably approximately 125° C. or less. If a greater temperature difference is needed, the other piece can be heated or cooled to achieve the desired total temperature difference as described herein. Different amounts of increases and/or decreases in the product piece and waste piece temperatures can be used to achieve these other temperature differentials.

In lieu of using a hot plate, heating waste piece 16 and/or substrate 20 can be accomplished by infrared heating, resistive heating or hot air. In lieu of using a thermoelectric cooling element, waste piece 18 can be cooled using dry ice, liquid nitrogen, cold gas (e.g. cold air or nitrogen), or placing a cooled piece of thermally conductive material (e.g. a metal such as aluminum or copper) against waste piece 18. The thermally conductive material can be cooled by placing it in liquid nitrogen.

While FIGS. 2A and 2B show substrate 20 being lifted out of contact with waste piece 16, in another embodiment, substrate 20 is lowered or dropped out of contact with waste piece 16. Also, waste piece 16 can be raised or lowered out of contact with substrate 20. Further, waste piece 16 can be permitted to fall out of contact with substrate 20 by the force of gravity.

Similarly, while FIGS. 3A and 3B show waste piece 18 being lifted out of contact with substrate 20, in other embodiments waste piece 18 is lowered out of contact with substrate 20. (Waste piece 18 can also be permitted to fall out of contact with substrate 20 by the force of gravity.) Similarly, substrate 20 can be raised or lowered out of contact with waste piece 18.

The lifting or lowering of the substrate and/or waste piece can be accomplished with other combinations of platforms holding, raising or lowering one or both of these pieces and/or vacuum chucks holding, raising or lowering one or both of these pieces. Also, the substrate and/or waste piece can be mechanically manipulated using other mechanisms as well, e.g. mechanical fingers that grasp the outer or inner diameter of these structures.

While FIGS. 2 and 3 show the various heating and cooling elements applied to the bottom side of work piece 10, in other embodiments, the various heating and cooling elements are applied to the top of work piece 10. Alternatively, the heating and cooling elements can be applied to both sides of work piece 10.

Instead of heating waste piece 18, substrate 20 can be cooled. (Care should be taken to avoid causing thermally induced stresses in substrate 20 that would cause substrate 20 to warp or crack.) Accordingly, all such changes come within the present invention.

We claim:

1. A method comprising:

providing a glass work piece with an inner cut and an outer cut formed therein, the portion of the work piece outside said outer cut constituting an outer waste piece, the portion of said work piece inside said inner cut constituting an inner waste piece, the portion of said work piece between said inner and outer cuts constituting a middle portion of said work piece;

heating the middle portion and cooling the inner waste piece including the sub-steps of,
placing said middle portion proximate to but not in contact with a surface of a heating element,
placing a cooling element against the inner waste piece, and
lifting the inner waste piece relative to the middle portion to thereby separate the inner waste piece from the middle portion; and
separating the inner waste piece from the middle portion.

2. Method of claim 1 wherein said cuts are provided in said work piece prior to said heating of the outer waste piece, said cuts extending through the entire thickness of said work piece.

3. Method of claim 1 wherein said inner and outer cuts are provided by applying a laser to said work piece, said cuts extending through the entire thickness of said work piece.

4. Method of claim 1 wherein said heating the outer waste piece is accomplished by placing said outer waste piece against a heating plate.

5. Method of claim 4 further comprising:
gripping said inner waste piece with a vacuum grip after said heating of said outer waste piece; and
raising said inner waste piece to thereby separate the inner waste piece and middle portion from said outer waste piece.

6. Method of claim 1 further comprising depositing a magnetic layer on the middle portion after the middle portion has been separated from the inner and outer waste pieces.

7. Method of claim 6 further comprising forming an underlayer between the middle portion and the magnetic layer, and forming a protective overcoat over the magnetic layer.

8. Method of claim 1 wherein said heating the outer waste piece comprises:
placing said outer waste piece against a heating element, said heating element comprising one or more channels formed therein; and
applying a vacuum to said one or more channels to hold said outer waste piece against said heating element.

9. Method of claim 1 wherein said outer cut circumferentially surrounds said middle portion.

10. Method of claim 1 wherein the temperature difference between the middle piece and the waste piece that said middle piece is being separated from during said separating is greater than about 100° C.

11. Method of claim 1 wherein the temperature difference between the middle piece and the waste piece that said middle piece is being separated from during said separating is greater than about 125° C.

12. Method of claim 1 wherein the temperature difference between the middle piece and the waste piece that said middle piece is being separated from during said separating is greater than about 150° C.

13. Method of claim 1 wherein said middle piece is subjected to a temperature cycle less than about 200° C. during said method.

14. Method of claim 1 wherein said middle piece is subjected to a temperature cycle less than about 150° C. during said method.

15. Method of claim 1 wherein said middle piece is subjected to a temperature cycle less than about 125° C. during said method.

16. Method comprising:
providing a glass work piece that surrounds a waste piece;
heating the glass work piece using a heating element comprising a fixed surface which heats the glass work piece without mechanically contacting the major surfaces of said work piece;
cooling the waste piece, wherein the waste piece contracts relative to the work piece, and the work piece expands relative to the waste piece; and
separating the work piece from the waste piece.

17. Method of claim 16 wherein the temperature difference between the work and waste pieces is greater than about 100° C. during said separating.

18. Method of claim 16 wherein the temperature difference between the work and waste pieces is greater than about 125° C. during said separating.

19. Method of claim 16 wherein the temperature difference between the work and waste pieces is greater than about 150° C. during said separating.

20. Method of claim 16 wherein said work piece is subjected to a temperature cycle less than about 200° C. during said method.

21. Method of claim 16 wherein said work piece is subjected to a temperature cycle less than about 150° C. during said method.

22. Method of claim 16 wherein said work piece is subjected to a temperature cycle less than about 125° C. during said method.

23. Method comprising:
providing a work piece comprising a crack extending all the way through the thickness of the work piece, said crack having a closed shape such that the crack surrounds a first portion of said work piece and is surrounded by a second portion of said work piece,
causing a temperature differential between said first and second portions subsequent to the providing step such that the first portion has a greater temperature than the second portion, thereby facilitating the separation of the first and second portions,
wherein the temperature difference between the work and waste pieces is greater than about 100° C.

24. Method of claim 23 wherein said causing comprises heating said second portion.

25. Method of claim 23 wherein said causing comprises cooling said first portion.

26. Method of claim 23 wherein said causing comprises heating said second portion and cooling said first portion.

27. Method of claim 23 wherein said first portion is disk shaped.

28. Method of claim 23 wherein said second portion is disk shaped.

29. Method of claim 23 wherein the temperature difference between the work and waste pieces is greater than about 125° C.

30. Method of claim 23 wherein the temperature difference between the work and waste pieces is greater than about 150° C.

31. Method of claim 23 wherein said work piece is subjected to a temperature cycle less than about 200° C. during said step of causing a temperature difference.

32. Method of claim 23 wherein said work piece is subjected to a temperature cycle less than about 150° C. during the step of causing a temperature difference.

33. Method of claim 23 wherein said work piece is subjected to a temperature cycle less than about 125° C. during the step of causing a temperature difference.

34. Method comprising:

providing a temperature difference between a product piece and a waste piece so that said waste piece and product piece can be moved relative to one another, said product piece including a data recording surface;

moving at least one of said product piece or said waste piece so that said moved product piece or waste piece is close enough to a vacuum chuck so as to be held by the vacuum chuck; and causing said vacuum chuck to hold at least one of said moved product piece or waste piece without physically contacting the data recording surface of the product piece.

35. Method of claim 34 wherein said vacuum chuck comprises two vacuum channels that are displaced from one another so that said vacuum chuck can hold both the product piece and the waste piece while the product and waste pieces are displaced relative to one another.

36. Method of claim 35 further comprising using said vacuum chuck to transport the waste and product pieces after the waste and product pieces are displaced from one another.

37. Method of claim 34 wherein the product piece is a glass substrate.

38. Method comprising:

providing a work piece and a waste piece;

placing one of the waste piece or the product piece adjacent to a temperature element, said temperature element changing the temperature of the adjacent waste piece or product piece so that the waste piece and produce pieces can be displaced relative to one another; and moving the adjacent waste piece or product piece by moving the temperature element in order that the waste and product pieces are displaced relative to one another.

39. Method of claim 38 wherein said placing comprises placing the waste piece over the temperature element.

40. Method of claim 38 wherein the product piece is a substrate.

41. Method of claim 38 wherein the temperature element is a cooling element.

42. Method of claim 38 wherein said moving the temperature element comprises lifting the temperature element while the waste piece rests on the temperature element.

* * * * *